(12) United States Patent
Helms et al.

(10) Patent No.: US 10,994,499 B2
(45) Date of Patent: May 4, 2021

(54) COMPOSITE YARN AND ITS MANUFACTURE

(71) Applicant: J&P COATS LIMITED, Uxbridge Middlesex (GB)

(72) Inventors: Kevin Helms, Raleigh, NC (US); Steven Todd Pool, Raleigh, NC (US)

(73) Assignee: J&P COATS LIMITED, Uxbridge (GB)

( * ) Notice: Subject to any disclaimer, the term of this patent is extended or adjusted under 35 U.S.C. 154(b) by 143 days.

(21) Appl. No.: 16/083,468

(22) PCT Filed: Mar. 9, 2017

(86) PCT No.: PCT/GB2017/050637
§ 371 (c)(1),
(2) Date: Sep. 7, 2018

(87) PCT Pub. No.: WO2017/153763
PCT Pub. Date: Sep. 14, 2017

(65) Prior Publication Data
US 2019/0070797 A1    Mar. 7, 2019

(30) Foreign Application Priority Data

Mar. 9, 2016 (GB) ...................... 1604047

(51) Int. Cl.
| | |
|---|---|
| *B29C 70/20* | (2006.01) |
| *B65H 51/01* | (2006.01) |
| *D01D 11/02* | (2006.01) |
| *D02G 3/04* | (2006.01) |
| *D02G 3/40* | (2006.01) |
| *D02J 1/18* | (2006.01) |

(52) U.S. Cl.
CPC ............. *B29C 70/20* (2013.01); *B65H 51/01* (2013.01); *D01D 11/02* (2013.01); *D02G 3/04* (2013.01);
(Continued)

(58) Field of Classification Search
CPC ........ B32B 5/08; B65H 51/01; B65H 51/015; B65H 57/02; B65H 57/26; D01D 10/04;
(Continued)

(56) References Cited

U.S. PATENT DOCUMENTS 5,000,807 A * 3/1991 Stuart .................... B65H 51/01
156/166
5,279,893 A * 1/1994 Hattori .................... B29C 70/20
428/300.4
(Continued)

FOREIGN PATENT DOCUMENTS

BE 706125 11/1967
EP 0504445 A1 9/1992
(Continued)

OTHER PUBLICATIONS

Database WPI, Week 197227; 1972; Thomson Scientific, London, GB; AN 1972-43970T; XP002770462, Month of Publication Unknown.
(Continued)

*Primary Examiner* — Michael A Tolin
(74) *Attorney, Agent, or Firm* — Blue Filament Law PLLC

(57) ABSTRACT

A method of manufacturing comingled yarn of carbon and thermofusible fibres comprises the steps of: feeding a tow of thermofusible fibres from a spool to a blending roller and between the spool and the blending roller, spreading the thermofusible tow; feeding a tow of carbon fibres from a spool to the blending roller; spreading the carbon fibre tow between the spool and the blending roller by applying a flow (Continued)

of air over the tow to urge the tow against a supporting surface over which the carbon fibres pass on their way to the blending roller; combining the thermofusible and carbon fibre tows at the blending roller.

12 Claims, 5 Drawing Sheets

(52) U.S. Cl.
CPC ............... *D02G 3/402* (2013.01); *D02J 1/18* (2013.01); *D10B 2505/02* (2013.01)

(58) Field of Classification Search
CPC ............... D01D 10/0436; D01D 11/02; D01D 10/0463; D01D 11/04; D02G 3/04; D02G 3/045; D02G 3/047; D02G 3/44; D02G 3/447; D02G 3/402; D02J 1/08; D02J 1/18; B29C 70/20; B29C 70/506; D10B 2505/02
See application file for complete search history.

(56) References Cited

U.S. PATENT DOCUMENTS

| 5,355,567 | A | * | 10/1994 | Holliday | ................. | B29C 70/16 |
| | | | | | | 156/148 |
| 6,032,342 | A | * | 3/2000 | Kawabe | ................... | D01G 9/08 |
| | | | | | | 28/283 |

FOREIGN PATENT DOCUMENTS

| EP | 0602618 A1 | 12/1992 |
| EP | 1641967 B1 | 5/2010 |
| JP | S4723350 B | 6/1972 |
| JP | 09324331 A | * 12/1997 |
| JP | H09324331 A | 12/1997 |
| WO | 2016/017469 A1 | 2/2016 |

OTHER PUBLICATIONS

International Search Report and Written Opinion for PCT/GB2017/050637 dated Jun. 12, 2017; 10 pages.

* cited by examiner

COMPOSITE YARN AND ITS MANUFACTURE

CROSS-REFERENCE TO RELATED APPLICATION

The present application is a national phase entry under 35 U.S.C. § 371 of International Application No. PCT/GB2017/050637, filed Mar. 9, 2017, which designates the United States of America, which claims priority to GB Application No. 1604047.9, filed Mar. 9, 2016, the entire disclosures of each of these applications are hereby incorporated by reference in their entireties and for all purposes.

BACKGROUND OF THE INVENTION

1. Field of the Invention

The present invention relates to yarn which comprises a blend of non-thermofusible fibres, such as glass or carbon and fibres which are thermofusible, such as fibres of polyamide, for example. Such yarn has a number of industrial uses. One such use is its application in the manufacture of composite materials such as carbon fibre composite.

2. Description of Related Art

Carbon fibre composite materials are increasingly used in industry because of their high strength to weight ratios. Such materials comprise reinforcing fibres of carbon retained in a matrix of reinforcing material, one example of which are various forms of epoxy. Desirably, the matrix will be dispersed uniformly and evenly throughout the reinforcing fibres. Traditionally, carbon fibres are laid in a desired configuration for the part to be manufactured, whereupon the matrix is dispersed within the fibres in liquid form and cured, for example in an autoclave. An alternative provides for the use of a composite yarn which comprises fibres of carbon and thermofusible fibres; the use of such composite yarn in the manufacture of parts provides an advantage in that the dispersal of the matrix is more uniform.

Composite yarn, its manufacture and use are all known per se from, for example, U.S. Pat. No. 7,192,634, US20050150593 and US2016075061.

SUMMARY OF THE INVENTION

The present invention provides a method of manufacturing comingled yarn of reinforcing and thermofusible fibres comprising the steps of: feeding a tow of thermofusible fibres from a spool to a blending roller and between the spool and the blending roller, spreading the thermofusible tow; feeding a tow of reinforcing fibres from a spool to the blending roller; spreading the reinforcing fibre tow between the spool and the blending roller by applying a flow of air over the tow to urge the tow against first and second supporting surfaces over which the reinforcing fibres pass on their way to the blending roller; combining the thermofusible and reinforcing fibre tows at the blending roller.

BRIEF DESCRIPTION OF DRAWINGS

Embodiments of the present invention will now be described, by way of example, and with reference to the accompanying drawings.

Referring now to FIG. 1, a roving 10 is made of comingled reinforcing fibres, such as those made of carbon, glass or aramid fibres and thermofusible fibres which serve to provide a matrix in a composite material made of both reinforcing and matrix fibres. The matrix fibres, being of a thermofusible nature may be formed from material such as, for example, polyamide, polypropelene, polyester, polyether ether ketone, polybenzobisoxazole or liquid crystal polymer. In the present embodiment, the thermofusible fibres are polyamide (nylon) and the reinforcing, non-thermofusible fibres are carbon. The reinforcing fibres may also be of a material that is thermofusible provided their thermofusion occurs at a temperature which is higher than the matrix fibres so that, when both fibres are used to create composite, at the temperature point at which thermofusibility of the matrix fibres occurs, the state of the reinforcing fibres is unaffected.

Figure 1:
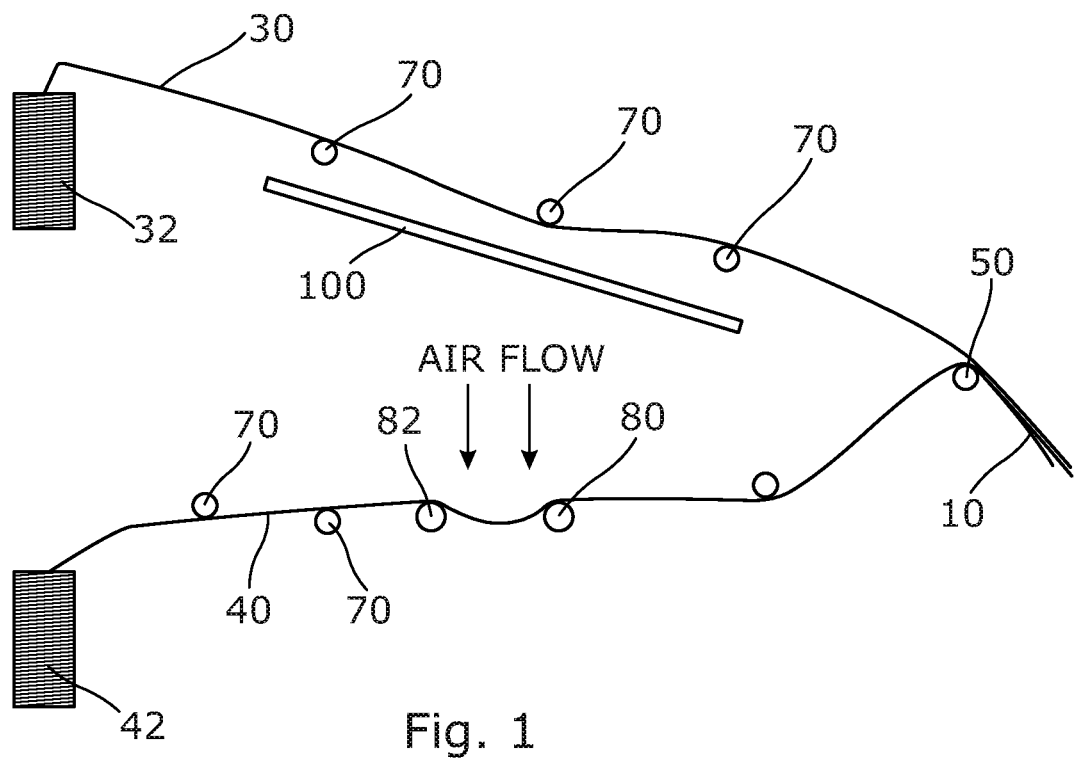
FIG. 1 is a side view of a first embodiment of apparatus for manufacturing comingled yarn according to an embodiment of the present invention.
Figure 2:
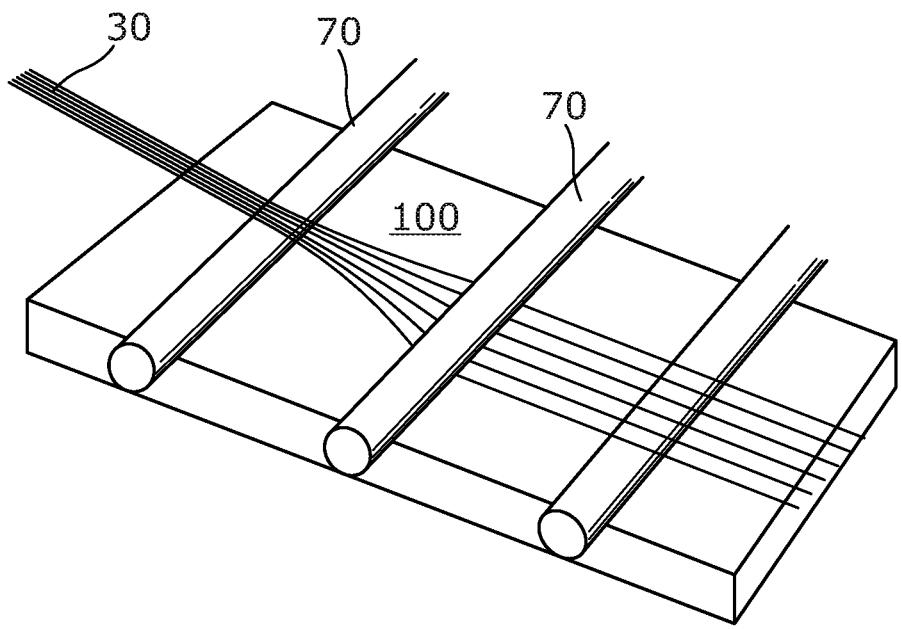
FIG. 2 is a perspective view of a detail of FIG. 1.

The nylon and carbon fibres are each fed from individual tows 30, 40 of pure nylon fibres 30 and pure carbon fibres 40 and combined to form the roving 10 at a blending roller 50. The nylon fibres are first drawn off a spool 32 to form the tow 30. Subsequently, the nylon fibres of the tow 30 pass over and under a sequence of guide rollers 70 during which time the fibres are spread. Referring additionally to FIG. 2, in the present embodiment the spreading of the nylon fibres is created by the use of static electricity. Accordingly, as the nylon tow 30 is drawn over and under the guide rollers 70 it passes over a charged plate 100. The electrostatic charge on the plate 100 is to cause mutual dispersal of the fibres due to electrostatic repulsion between them as a consequence of the charge acquired during their passage over the plate 100.

Figure 3:
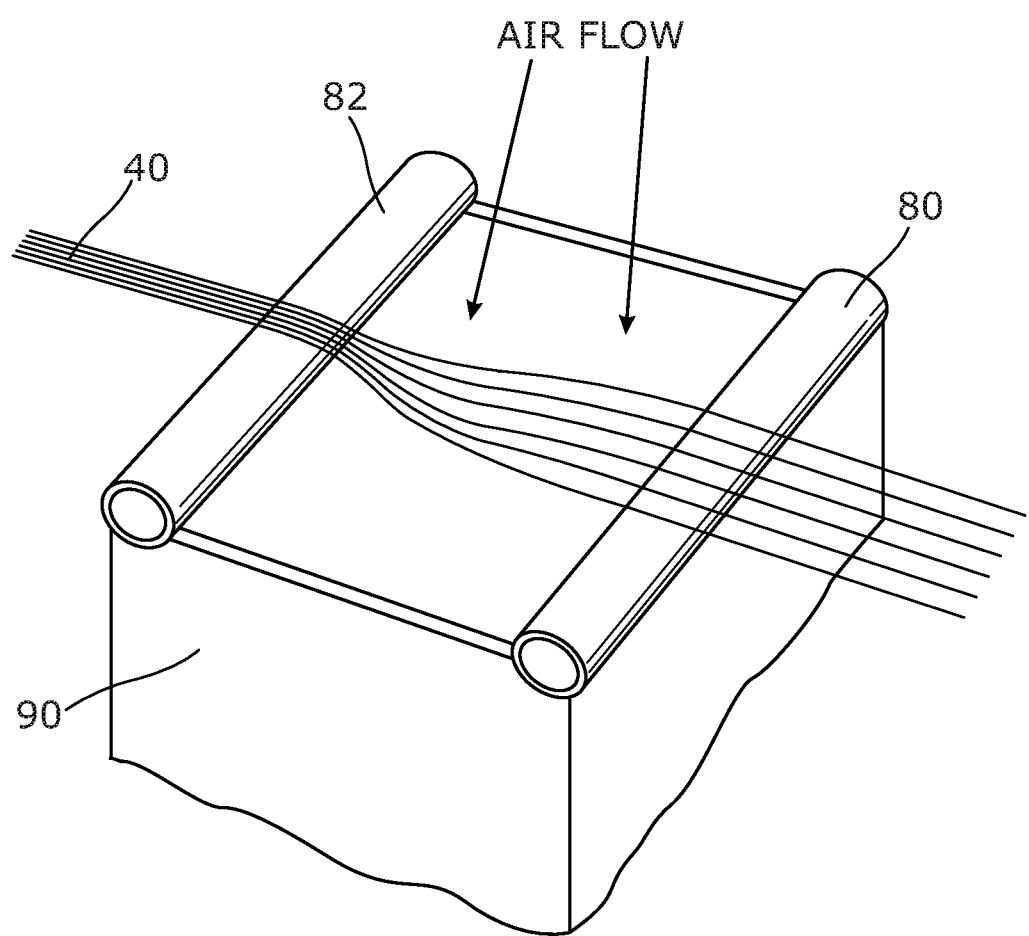
FIG. 3 is a perspective view of a further detail of FIG. 1.

The carbon fibres of the tow 40 are drawn off spool 42, and guided by guide rollers 70. Referring additionally to FIG. 3, the carbon fibres of tow 40 are spread by the use of a flow of air passing over the tow 40 which has the action of dispersing the fibres. In the present example, the air flow passes transverse, and preferably substantially orthogonally to the length of the fibres of the tow 40. The air flow has the action of urging the tow 40 against a supporting surface and, as a consequence, of dispersing the fibres of the tow across that surface. The supporting surface extends transversely, and preferably substantially orthogonally to the length of the fibres (and therefore the motion of the tow) and in the present example a supporting surface is provided by a cylindrical mandrel 80. A further supporting surface 82, provided by a further mandrel 82 is provided upstream of the mandrel 80 and the action of the air flow in combination with the surfaces have, as a consequence of the fibres of the tow being urged against them by the air flow, a dispersing effect upon the fibres of the tow. The air flow is created by an air pressure differential across the movement of the tow 40 and the extent of the dispersal of the fibres on the supporting surface or surfaces is related to the air pressure gradient in the region of the tow 40 and supporting surfaces 80, 82.

One way of creating a pressure gradient is to apply a negative air pressure within a conduit 90 to create the pressure differential and the resultant air flow into the conduit (from air outside of it) and to mount the supporting surfaces 80, 82 at the mouth of the conduit where the pressure gradient is at its highest. One characteristic of a negative air flow and therefore a negative air pressure is that the air flow rate is higher at the point where the fibres are most deflected (which would not be the case with a positive pressure emitted from a conduit where the flow rate would decrease upon exit of the air from the conduit, and where the fibres would be deflected away from the conduit).

In an alternative embodiment, a positive air pressure could be applied from within the conduit 90 but the tow would then have to pass under the supporting surfaces 80, 82, rather than over them (passing over the surfaces 80, 82 being the configuration illustrated in FIG. 3) in order for the air flow to urge the fibres of the tow against the supporting surfaces 80, 82. Such a modification would result in the need for some design modifications complications if, as desired, the location at which the supporting surfaces 80, 82 are to be located is at the mouth of the conduit 90 where the pressure gradient is at its highest.

In one embodiment, the nylon tow comprises 72 fibres having a weight of around 100 Tex and a thickness when it is drawn off the spool 32 of around 1 mm. A typical carbon fibre tow comprises 3000 fibres with a weight of around 200 Tex. Preferably, both tows 30, 40 are spread to a width of around 40 mm prior to being comingled at the blending roller 50 at which 72 nylon fibres are comingled with 3000 carbon fibres. Because the specific gravity of the carbon fibres is significantly higher than that of the nylon fibres, the volumetric ratio of fibres in the comingled roving 10 is in the region of 60:40; carbon:nylon.

The nylon fibres are relatively weak, but do have significant capacity for elongation without breaking (the term 'elongation' being a vernacular term for such a capacity), sometimes up to 100% of their original length, but more typically 20%-40%. This capacity for elongation means that the nylon tow 30 is fed with a relatively low tension (in the region of 0.3N) and this low tension, together with the relative low density of nylon fibres and the high elongation facilitates the electrostatic dispersal of nylon fibres. It has been found that voltages of between 4 and 20 KV are suitable for generating appropriate dispersal of fibres in the nylon tow.

By contrast, although the carbon fibres are typically in the region of 10 microns in diameter individually, they are strong, dense (and so individually relatively heavy) and have virtually no elongation but are brittle and prone to breakage by snapping as a consequence. The carbon tow is therefore drawn with at tension in the region of 3N, an order of magnitude greater than that of the nylon. It follows that a pressure gradient is required to have the effect of dispersing the fibres against the supporting surfaces. Accordingly, that flow (and therefore the pressure gradient giving rise to it) is desirably at its highest in the region of the tow, whilst the gradient is, desirably, constant with time, in order to endure that a constant dispersing force is applied to the fibres, thereby reducing the number of breakages of fibres. To this end, one or more plenum or other intermediate chambers may be employed within the conduit smooth any pressure variations caused, for example, in the case of a negative air pressure caused by an impeller with rotating blades.

The blending roller 50 is preferably made of a conducting material which is earthed so that the charge carried by the nylon fibres dissipates at the point of comingling. The relative conductivity of the carbon fibres additionally assists with this process. Further, the tows are drawn off their respective spools and fed to the blending roller feed at a higher speed than the linear speed of motion of the blending roller 50, thereby to provide for a controlled tension of the comingled roving 10 (given that it comprises fibres which have, prior to that point, been drawn with greatly varying tensions).

Figure 4:
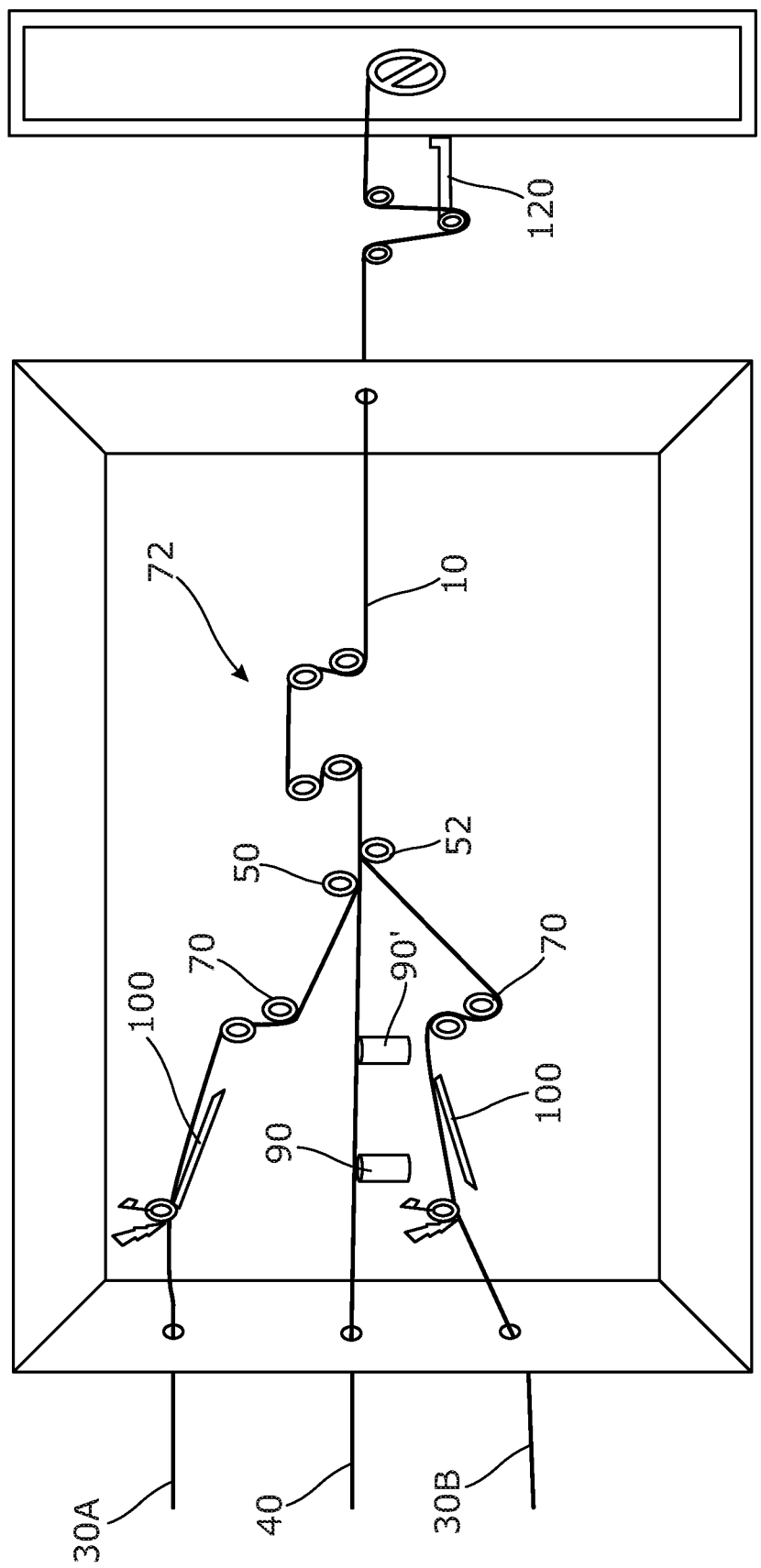
FIG. 4 is a side view of a further embodiment of apparatus for manufacturing comingled yarn side view of a further apparatus for manufacturing yarn according to an embodiment of the present invention.
Figure 5:
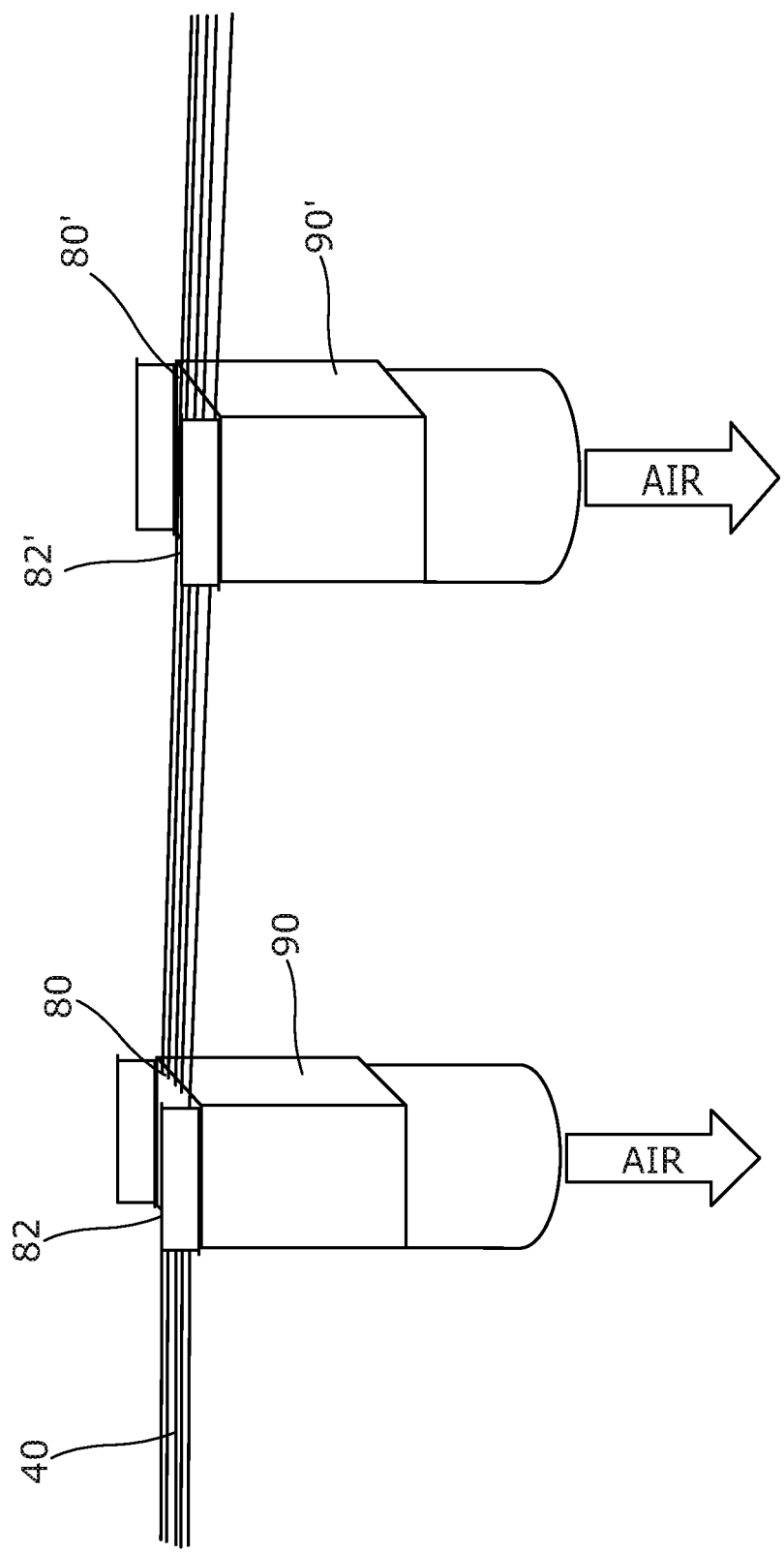
FIG. 5 is a perspective view of a detail of FIG. 4.

Referring now to FIG. 4, a further embodiment of apparatus for performing the method will now be described wherein like elements are designated with like reference numerals. Two nylon tows 30A, B, each of 72 fibres and around 100 Tex are drawn off respective spools (not shown). Both upper and lower tows 30A, B pass over a charged plate 100 which, in the manner described above in connection with the first embodiment, causes lateral dispersal of the fibres of the tow. A carbon fibre tow 40 of some 6000 filaments and in the region of 400 Tex is drawn off its spool (not shown). Dispersal of the tow in the present embodiment is achieved by two, distinct, air flows. Referring additionally to FIG. 5, according the present embodiment, the tow 40 passes through a first air flow which, as with the previous embodiment, is created by a negative air pressure that draws the tow onto a pair of supporting surfaces 80, 82 located at the mouth of a first conduit 90 and which extend laterally with respect to the direction of motion of both the tow 40 and the air flow; and then over through a second air flow, created by a negative air pressure that draws the already-partly dispersed tow 40 onto a further pair of supporting surfaces 80', 82' provided at the mouth of a second conduit 90', the further supporting surfaces 80', 82' also extending laterally. Preferably the first and second air flows are generated by one or more vacuum pumps (not shown) to create the air flows within the conduits 90, 90'.

Electrostatic dispersal of the nylon fibres of upper tow 30A and the two separate instances of dispersal of the carbon fibres cause the nylon and carbon tows to have approximately equal, dispersed widths at the point of their union into a single, comingled roving at blending roller 50. The yarn of the comingled roving is then fed to a further blending roller 52 where it is combined with the electrostatically dispersed tow 30B of nylon. Notably, the upper nylon tow 30A is fed to the first blending roller 50 above the carbon fibres, whilst the lower nylon tow 30B is fed to the second blending roller 52 from below the yarn of the first comingled roving from the first blending roller 50, thereby to produce a final comingled roving having more evenly dispersed fibres. The drawing rollers 70 rollers for the various tows feed to the blending rollers 50, 52 at a higher speed than the blending rollers 50, 52 feed onto the un-driven jockey rollers 72 in order to ensure a controlled tension in the final, comingled yarn. Thereafter the comingled roving is drawn onto to a spool 120 where the comingled yarn is stored.

Figure 6:
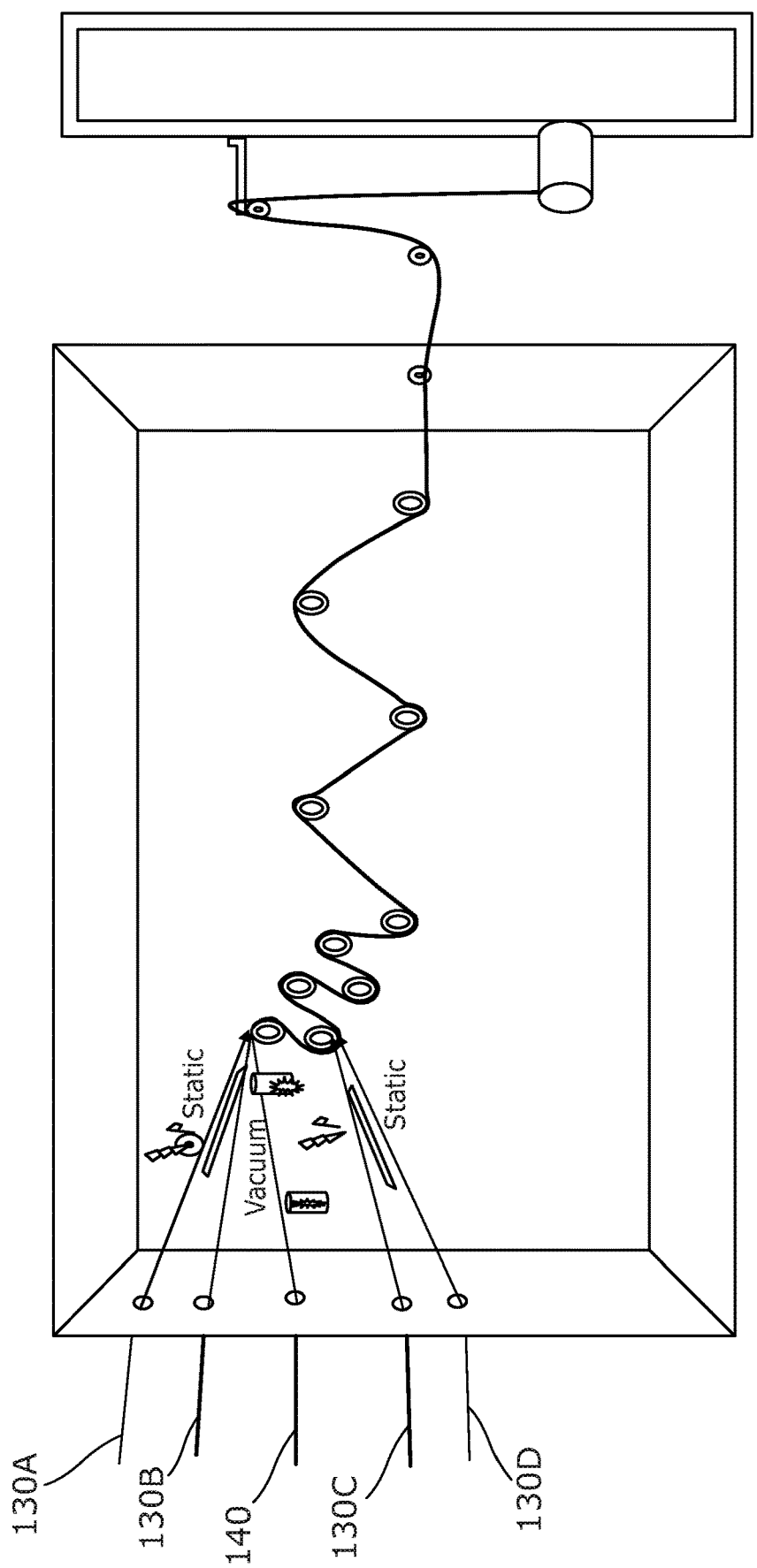
FIG. 6 is a side view of yet a further embodiment of apparatus

A further embodiment is illustrated in FIG. 6 and comprises two upper tows 130A, B and two lower tows 130C, D which are combined with a central carbon fibre tow 140 in the same manner as previously described in connection with FIG. 4.

The invention claimed is:

1. A method of manufacturing comingled yarn of reinforcing and thermofusible fibers comprising:
   feeding a tow of thermofusible fibers from a first spool over and under a series of single guide rollers positioned to define a path in which the tow of thermofusible fibers is spread along a width of the path and to a blending roller, wherein the tow of thermofusible fibers is fed at a first tension;

spreading the tow of thermofusible fibers through application of only static electricity to charge the tow of thermofusible fibers to induce electrostatic repulsion between individual fibers of the tow of thermofusible fibers to form spread thermofusible fibers;

feeding a tow of reinforcing fibers from a second spool to the blending roller, wherein the tow of reinforcing fibers is fed at a second tension that is ten times greater than the first tension;

spreading the tow of reinforcing fibers between the second spool and the blending roller by applying a first flow of air over the tow of reinforcing fibers to urge the tow of reinforcing fibers against first and second supporting surfaces over which reinforcing fibers of the tow of reinforcing fibers pass on a path to the blending roller to form spread reinforcing fibers; and combining the spread thermofusible and spread reinforcing fibers at the blending roller, wherein the blending roller has a linear speed of motion that is less than a speed at which the tow of thermofusible fibers and the tow of reinforcing fibers are fed to the blending roller.

2. The method according to claim 1 wherein the first flow of air is located between the first and second supporting surfaces.

3. The method according to claim 2 wherein the first and second supporting surfaces are provided by first and second cylindrical mandrels, respectively.

4. The method according to claim 2, wherein the first flow of air is provided by means of a conduit and the first and second supporting surfaces are provided at a mouth of the conduit.

5. The method according to claim 4 wherein the first flow of air occurs into the conduit.

6. The method according to claim 1 wherein the first and second supporting surfaces extend transverse to a direction of the first flow of air and to a direction of motion of the tow of reinforcing fibers.

7. The method according to claim 1, wherein the blending roller is grounded to cause the charge on the tow of thermofusible fibers to dissipate upon contact with the blending roller.

8. The method according to claim 1 wherein the first flow of air is created by a pressure differential extending transverse to the tow of reinforcing fibers.

9. The method according to claim 8 wherein the pressure differential is generated by the creation of a negative air pressure within a conduit drawing the tow of reinforcing fibers against the first and second supporting surfaces.

10. The method according to claim 1, wherein the tow of reinforcing fibers is spread between the second spool and the blending roller by applying the first flow of air at a first location over the tow of reinforcing fibers to urge the tow of reinforcing fibers against the first and second supporting surfaces over which the reinforcing fibers of the tow of reinforcing fibers pass and, at a second location spaced longitudinally from the first location, applying a second flow of air over the tow of reinforcing fibers to urge the tow of reinforcing fibers against a third supporting surface and a fourth supporting surface over which the spread reinforcing fibers pass.

11. The method according to claim 1 in which the spread thermofusible fibers are combined with the spread reinforcing fibers at the blending roller to form a first comingled roving and spread fibers of a second tow of thermofusible fibers are combined with the first comingled roving at a second blending roller to form a final comingled roving.

12. The method according to claim 11 wherein the spread thermofusible fibers and the spread fibers of the second tow of thermofusible fibers are fed to the first and second blending rollers, respectively, from opposing directions so as to comingle from opposite sides of the spread reinforcing fibers.

* * * * *